United States Patent

McCloskey

[15] 3,642,204
[45] Feb. 15, 1972

[54] WATERFLOW-CONTROLLING APPARATUS FOR AN AUTOMATIC IRRIGATION SYSTEM

[72] Inventor: Edward W. McCloskey, 271 Alpine St., Pasadena, Calif. 91106

[22] Filed: Nov. 28, 1969

[21] Appl. No.: 880,851

[52] U.S. Cl. ............................................................. 239/63
[51] Int. Cl. .................................. A01g 25/00, B05b 17/04
[58] Field of Search ........................................ 239/63, 64, 65

[56] References Cited

UNITED STATES PATENTS

| | | |
|---|---|---|
| 2,445,717 | 7/1948 | Richards ............................. 239/63 X |
| 2,674,490 | 4/1954 | Richards ............................. 239/63 X |
| 2,821,434 | 1/1958 | Hunter et al. ....................... 239/63 X |
| 2,863,698 | 12/1958 | Richards ............................. 239/63 X |
| 2,946,512 | 7/1960 | Richards ............................... 239/63 |
| 3,438,575 | 4/1969 | Rohling ............................... 239/63 X |

Primary Examiner—M. Henson Wood, Jr.
Assistant Examiner—Edwin D. Grant

[57] ABSTRACT

The specification discloses waterflow-controlling apparatus for an automatic irrigation system of a simple type including a single moisture-sensing means and one or more automatic sprinklers or other watering means controlled thereby or a plurality of such units together comprising a substantially larger automatic irrigation system. The waterflow-controlling apparatus includes one or more of the moisture-sensing means referred to above operatively controlling one or more waterflow-controlling means, such as valve means, in a water supply line feeding water to one or more sprinklers or other irrigating outlets, with each such moisture-sensing means comprising a hollow cell having a water-permeable wall in water-transmissive relationship with an adjacent porous medium which, in one form, includes a main medium such as a body of earth and in another form includes such a main medium and intermediate medium such as diatomaceous earth or other porous, water-holding and water-transmissive medium, which in one form is disclosed as having its water permeability controllably adjustable. The transmission of water in or out of the cell of the moisture-sensing means produces a corresponding interior pressure variation which effectively operates the water-flow-controlling valve means in a waterflow-producing direction either directly, through water pressure operated servo means, electrical servo means, or otherwise, when the moisture content of the earth adjacent to the moisture-sensing means falls below a predetermined value and, conversely operates said waterflow-controlling means in a waterflow-reducing direction when the moisture content in the earth adjacent to the moisture-sensing means rises above a predetermined value. In one form of the invention, the inverse feedback nature of the moisture-sensing and waterflow-controlling operations is of a continuous, inversely proportional nature rather than of an on-off nature.

18 Claims, 13 Drawing Figures

INVENTOR.
EDWARD W. McCLOSKEY

3,642,204

WATERFLOW-CONTROLLING APPARATUS FOR AN AUTOMATIC IRRIGATION SYSTEM

Generally speaking, the present invention comprises a flow-controlling apparatus for an automatic irrigation system which, together with a source of water, water distribution means and water dissemination or irrigating means, may be said to comprise such an automatic irrigation system. It should be noted that the invention is directed to both the complete automatic irrigation system and the waterflow-controlling apparatus, per se, as a subcombination thereof and may be said to comprise one or more moisture-sensing means, each comprising a hollow sealed cell or chamber-defining container means having at least a portion thereof provided with a water-permeable, porous wall and adapted to be filled with water. The water-permeable, porous wall of the hollow, sealed cell of the moisture-containing means is adapted to be placed in water-transmission relationship with respect to a porous, granular medium, such as a body of earth or the like, either directly or by way of an intermediate, water-holding and water-permeable, porous medium positioned between said porous wall portion and said body of earth. The porous characteristics of said porous wall portion, said porous body of earth, and said porous intermediate medium, where such is employed, are such as to effectively transmit water therethrough from the interior of the hollow sealed cell of the moisture-sensing means outwardly toward and into said body of earth whenever said body of earth and/or said intermediate porous medium, where such is used, is or are less than fully saturated with water, which condition produces what might be termed a soil suction acting through said porous media on the liquid within the interior of the hollow sealed cell by reason of intermolecular forces and the phenomena arising therefrom primarily known as capillarity, although surface tension is another aspect of the same intermolecular forces. Thus, whenever the adjacent earth around the moisture-sensing means is less than fully saturated with water, some of the water within the hollow sealed cell of the moisture-sensing means will be withdrawn therefrom and will cause a corresponding reduction in interior pressure therein, which may also be thought of as a vacuum or negative pressure relative to the constant exterior ambient atmospheric pressure, which pressure variation is then effectively employed for operating waterflow-controlling valve means in a main water supply line to one or more sprinklers or other water-disseminating or irrigating means so as to cause water to be disseminated upon or into a quantity of earth including the particular body of earth surrounding the moisture-sensing means. This irrigating operation will continue until the body of earth surrounding the moisture-sensing means becomes progressively more saturated than its previous condition, which will reverse the transmission of water through the above-mentioned porous media back into the interior of the hollow sealed cell of the moisture-sensing means until such time as its interior pressure rises to a magnitude such as to cause the closure (in certain forms of the invention, the progressive closure) of the waterflow-controlling valve means which, of course, immediately stops (or, in certain forms of the invention, reduces the magnitude of) the irrigating operation. The waterflow-controlling means may be directly operated by the above-mentioned pressure variation or effectively operated by servo means operated by said pressure variation, and said servo means may be of a water pressure operated type, an electric energy operated type, or otherwise. In one form of the invention wherein the servo means is of an electrically operated type, it may include a complete, self-contained electrical system including electric energy storage means, electrical circuit means connected thereto, and electric switch means for connecting same to an electrically energizable servomotor means controlling the operation of a main valve in the water supply line to the water-disseminating means or irrigating means. The electrical storage means may be arranged to be periodically recharged by waterflow-powered electrical generating means (or other equivalent) electrically coupleable with respect to the electrical energy storage means (in one preferred form, through electrical rectifier means for periodically recharging the electrical energy storage means during periods of water flow so that the electrical storage means will at all times be sufficiently charged to be entirely capable of operating the electrically energizable servomotor means for operating the valve in the main water supply line. This type of electrical system is completely self-contained and electrically isolated and insulated so as to be virtually foolproof and require little or no service or maintenance.

In a preferred form of the invention, means may be provided for controllably adjusting the effective water permeability or water transmissiveness of the intermediate porous medium (or, for that matter, of the porous wall portion itself of the hollow cell of the moisture-sensing means).

In one preferred form of the invention, means is provided for controllably adjusting the depth of embedment of the moisture-sensing means within a body of soil.

With the above points in mind, it is an object of the present invention to provide an improved waterflow-controlling apparatus having any or all of the advantages referred to herein and including any or all of the features referred to herein, generically and/or specifically and individually or in combination, and which is of relatively simple, inexpensive, easily manufactured construction both as to initial capital cost (including tooling costs, etc.,) and as to the cost of production per item or unit such as to facilitate widespread large-scale manufacturing, sale and use of the invention for the purposes outlined herein or for any substantial functional equivalents thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary embodiments of the invention are illustrated in the hereinbelow-described figures of the accompanying drawings and are described in detail hereinafter.

Figures 1, 2, 8A, 12:
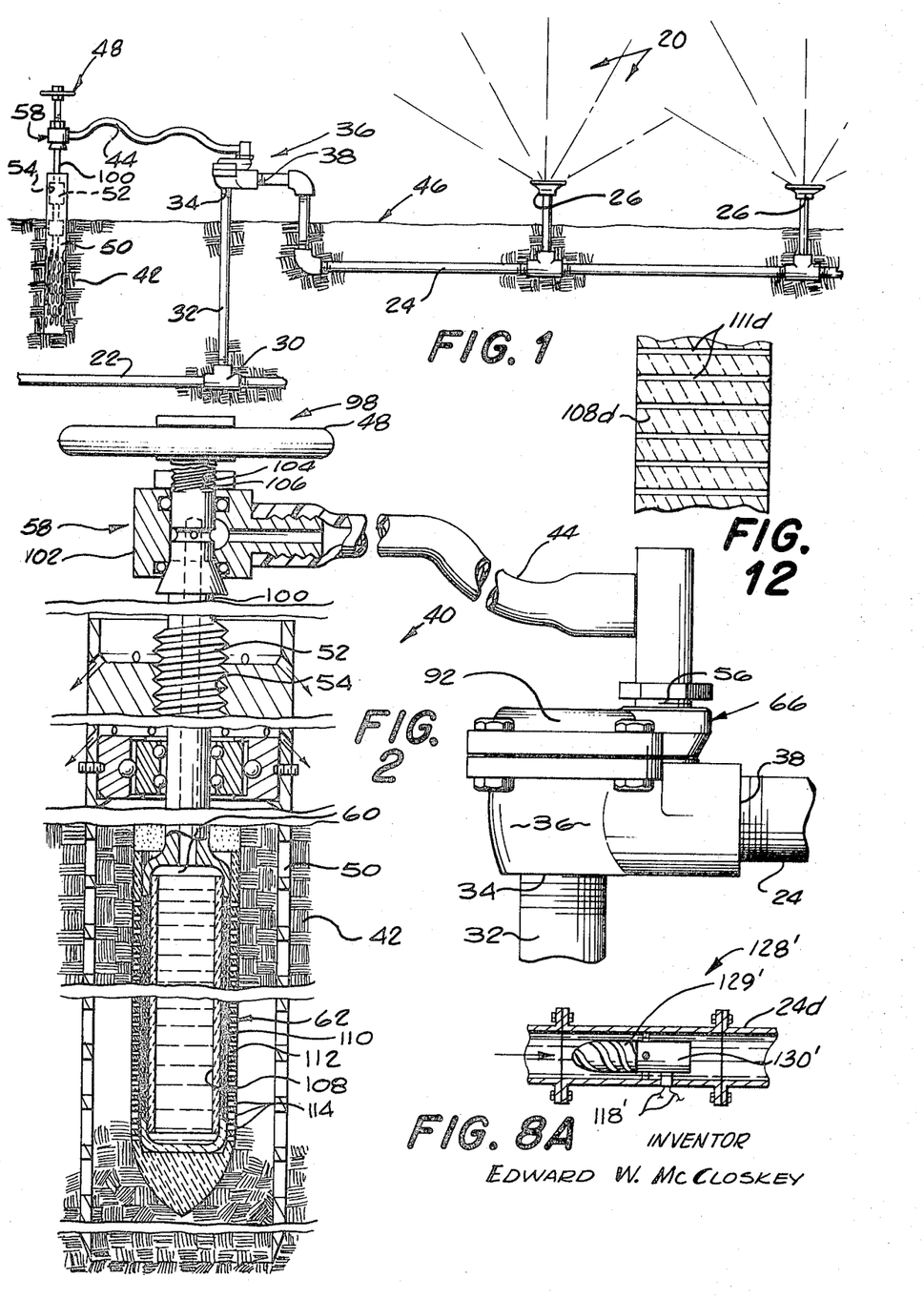
FIG. 1 is a greatly reduced size, fragmentary, partially broken away, somewhat schematic and diagrammatic view illustrating one exemplary embodiment of the present invention wherein it comprises an automatic irrigation system or a portion thereof. In other words, the apparatus of FIG. 1 may comprise an automatic irrigation system in itself except for a source of water under pressure, not shown but understood to be connected to the sprinkler pipe, or it may comprise merely one unit of a much larger automatic irrigation system comprising a plurality of generally similar units.
FIG. 2 is a fragmentary, partially broken-away view drawn to a larger scale than FIG. 1, partly in elevation and partly in section, of the moisture-sensing means of FIG. 1, and of a portion of the waterflow-controlling valve means effectively operated thereby.
FIG. 8A is a fragmentary view similar to a small portion of FIG. 7 and to FIG. 8 and illustrates a very slight modification of the waterflow-powered electrical generating means thereof.
FIG. 12 is a greatly enlarged, fragmentary, cross-sectional view similar to FIG. 11, but illustrating a different type of porous wall wherein the passages therethrough comprise effective capillary passage openings of relatively straight and substantially parallel relationship, although not specifically so limited.

Generally speaking, the apparatus illustrated in FIG. 1 may be said to comprise the complete waterflow-controlling apparatus generally designated by the reference numeral 20, the main water supply pipe or conduit 22, and the water distributing system comprising the pipe 24 and one or more sprinklers or other water-disseminating or irrigating means such as indicated at 26. In the example illustrated in the first form of the invention shown in FIGS. 1–6, the main water supply pipe 22 is shown broken away at one end, indicated at 28, and it is to be understood that said broken-away end is adapted to be connected to a suitable source of water under pressure and that the details thereof are not shown since such water supply arrangements are well known in the art and do not touch upon the real inventive concept of the present invention.

Figures 3, 4, 5, 10, 11:
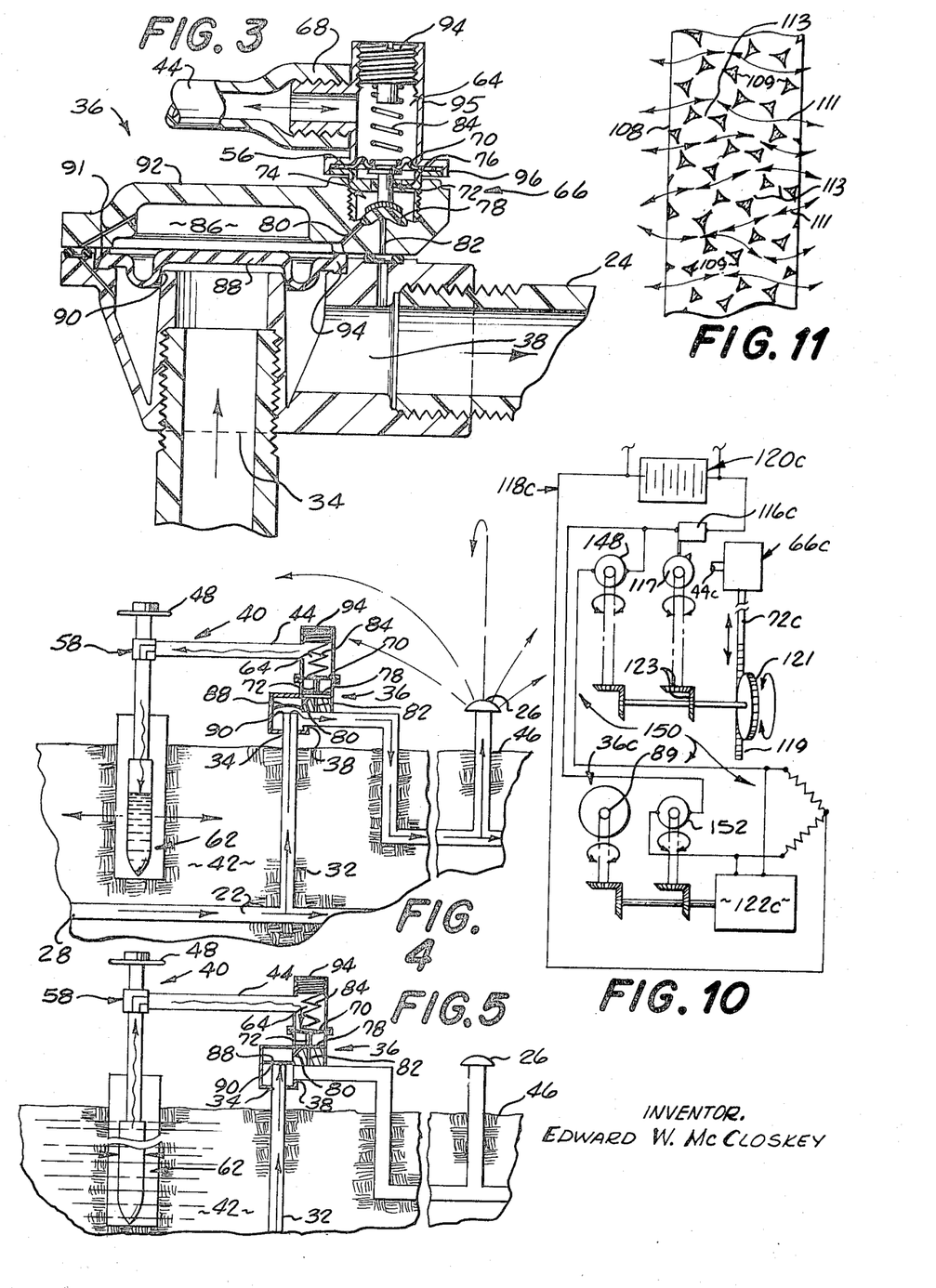
FIG. 3 is a fragmentary, larger-scale, partially broken-away view, partly in section and partly in elevation, illustrating in greater detail the exemplary waterflow-controlling valve means of FIGS. 1 and 2.
FIG. 4 is a fragmentary, schematic, diagrammatic view fragmentarily illustrating the apparatus of FIG. 1 when the moisture-sensing means senses that the earth surrounding same contains less moisture than a predetermined amount thereof and thus creates what might be termed a "soil suction" of a predetermined magnitude sufficient to cause operation of the waterflow-controlling valve means by the effective opening thereof so as to feed water to the sprinkler means for applying moisture to the soil. This operation is illustrated in FIG. 4 in a very schematic way.
FIG. 5 is a schematic view similar to FIG. 4, but illustrates the situation after the sprinkler has moistened the soil sufficiently to reduce the "soil suction" to a value below a predetermined magnitude such as to cause reverse operation of the waterflow-controlling valve means in a manner such as to shut off the flow of water to the sprinkler head and the sprinkling thereby of moisture onto the soil. This moisture cutoff operation is illustrated in FIG. 5 in a very schematic way, and it should be understood that the overall system of FIG. 1 continues to cycle back and forth between the conditions shown in FIGS. 4 and 5, thus at all times maintaining the moisture content of the soil between predetermined upper and lower limits which may be selected as ideal for the growing of any particular form of plant life thereon.
FIG. 10 is a view generally similar to a portion of FIG. 7 but illustrates a modified electrically operated form of the invention wherein the operation of the waterflow-controlling valve means by the electrically energized servomotor means is not of just an on-off nature but is of a proportionate nature in an inverse feedback sense so as to correct the deficient moisture condition in the earth surrounding the moisture-sensing means by causing the valve to open to a degree such and the sprinkler to sprinkle water on the surface of the earth in a magnitude which is an inverse function of the magnitude of the moisture deficiency measured by said moisture-sensing means, thus producing a corrective moisturizing of the soil of a magnitude corresponding to the need therefor.
FIG. 11 is a greatly enlarged, fragmentary, cross-sectional view illustrating one exemplary form of the porous wall of the moisture-sensing means wherein the wall has a plurality of interconnecting cells defining a plurality of tortuous path passages therethrough of effective capillary size.

In the example illustrated, the water supply pipe 22 is connected by a T fitting 30 to a branch pipe 32 which extends into a threaded inlet fitting 34 of a waterflow-controlling valve means, generally designated by the reference numeral 36. Said valve means 36 has a threaded outlet fitting 38 connected in sealed engagement with respect to an inlet end of the previously mentioned water distributing pipe 24. Normally, the inlet and outlet openings or ports 34 and 38 of the waterflow-controlling valve 36 are effectively sealed from each other by the interior valving mechanism of said valve 36, which will be described in some detail later on, but whenever the moisture-sensing means, generally designated by the reference numeral 40, senses that moisture in the body of soil 42 adjacent thereto is below a predetermined value, the reduction of pressure in the vacuum duct 44 connected to the valve 36 effectively opens the interior valving mechanism of the valve 36 in a manner which places the inlet and outlet portions 34 and 38 in communication so that water from the main water supply line 22 can flow through the T, the branch pipe 32, the inlet port 34, the outlet port 38, the water distributing pipe 24, and one or more sprinklers or other water-disseminating or irrigating outlets 26 into irrigating relationship with respect to the entire surface, indicated generally at 46, of the adjacent body of soil, which includes the previously mentioned body of soil 42 surrounding the moisture-sensing means 40. This condition of irrigating operation of the apparatus is best illustrated in FIG. 4 and will continue until such time as the body of soil 42 surrounding the moisture-sensing means 40 becomes sufficiently saturated or moist as to cause (in a manner which will be described hereinafter) the moisture-sensing means 40 to produce an increase in pressure in the vacuum duct 44 to an extent such as to effectively operate the valving mechanism within the valve 36 in a valve-closing direction such as to effectively break the previously temporarily existing communication between the inlet and outlet ports 34 and 38 and to thus cause the cessation of the water flow or irrigating operation of the entire apparatus, generally designated by the reference numeral 20. This condition is best shown in FIG. 5 and will continue until such time as the body of earth 42 around the moisture-sensing means 40 dries out to a degree such as to again cause the moisture-sensing means 40 to bring about a reduction in pressure in the vacuum line 44 to an extent such as to again open the valve 36 and cause the watering or "on" cycle of operation of the entire apparatus 20 to again resume in the manner best shown in FIG. 4.

In other words, the entire waterflow-controlling apparatus, generally designated by the reference numeral 20, continues to cycle between the "on" condition shown in FIG. 4 and the "off" condition shown in FIG. 5 at repetitive rates determined primarily by the combined rate of drainage and of evaporation of water from the body of earth 42 during the "off" cycle and the rate of water irrigation or water dissemination from the sprinklers 26, or other functional equivalent, during the "on"

cycle and by the lengths of the periods of duration of said "on" and "off" cycles.

In the example illustrated in the first form of the invention, it will be noted that the main water supply pipe 22 is buried under the surface 46 of the body of earth 42, as is the water distributing pipe 24. This is also true of the moisture-sensing means 40. The remainder of the exemplary first form of the invention illustrated is positioned above the surface 46 of the body of earth 42. However, this arrangement may be modified by burying all portions of the apparatus except the sprinklers 26 or other water-disseminating or irrigating means below the surface 46 of the body of earth 42 if desired. The arrangement illustrated in the exemplary first form of the invention is convenient since it places the waterflow-controlling valve means 36 above the surface 46 of the body of earth 42 in a position such as to make it possible for it to have its operating point readily adjusted and also in a position which facilitates easy repair, servicing, and maintenance of the valve 36 if such should be required. Also, the arrangement illustrated makes it possible to easily adjust the depth of embedment of the moisture-sensing means 40 by merely rotating the operating handle 48 which will cause the moisture-sensing means 40 to move upwardly or downwardly within the perforated containing housing or pipe 50 which is in a fixed relationship with respect to the valve 36 and which has its lower end embedded a substantial distance within the body of earth 42 below the surface 46 thereof. Thus, by merely rotating the operating handle 48, it will cause the threaded lead screw portion 52 of the moisture-sensing means 40 to threadedly advance downwardly with respect to the corresponding interiorly threaded portion 54 positioned within the housing 50 so that the moisture-sensing means 40 will move upwardly or downwardly within the perforated housing 50 to any desired depth of embedment.

It should be noted that the vacuum tube 44 connects to the servo inlet fitting 56 of the valve 36 in a flexible or coilable and extendable or retractable manner which allows the above-mentioned repositioning of the moisture-sensing means 40 and yet which maintains a sealed connection with the interior thereof and with the interior of the servo or operating portion of the valve 36. This may be provided by reason of a coiled configuration of the vacuum tube 44, by reason of the flexible nature thereof, or by reason of a flexible, rotatable and/or swiveling connection or coupling of said vacuum duct 44 with respect to the interior of the moisture-sensing means 40 or the servo inlet port 56 of the servo or operating portion of the valve 36. One such representative but nonspecifically limiting rotatable swiveling connection or coupling is indicated generally by the reference numeral 58 and is of a type which, when effectively unlocked, allows such relative rotation or swiveling motion but which, when subsequently locked, provides an absolutely rigid and airtight connection between the hollow interior 60 of the hollow sealed cell or chamber-defining container means indicated generally at 62, of the moisture-sensing means 40 and the upper interior chamber 64 of the servo operating means indicated generally at 66 of the valve 36 and which comprises that portion of said servo means 66 lying within the housing portion 68 and above the diaphragm (or piston) 70.

The servo diaphragm (or piston) 70 is connected to and operates a rod member 72 which extends into a closed, sealed chamber indicated generally at 74 through sealing means 76 and operates a servo valve member 78 positioned within the chamber 74. Normally when the entire valve 36 is in closed relationship, the valve member 78 is all the way down, as shown in FIG. 5, and closes both of the openings 80 and 82 for purposes which will be explained hereinafter. The valve member 78 is normally maintained in said extreme downward position closing the ports 80 and 82 by reason of the fact that the adjustable biasing spring 84 in the upper servo chamber 64 biases the diaphragm 70 and the connecting rod 72 downwardly with a force sufficient to balance out the upward-acting differential force exerted across the servo diaphragm 70 by reason of the fact that ambient atmospheric pressure is applied to the lower surface thereof while the previously mentioned vacuum tube 44 applies the control pressure from the cell 62 of the moisture-sensing means 40 to the upper surface of the servo diaphragm 70.

Thus, whenever the body of earth 42 surrounding the moisture-sensing means 40 is fully saturated with water, thus producing what is commonly known as a zero soil suction, the pressure within the vacuum duct 44 leading from the hollow interior 60 of the cell 62 of the moisture-sensing means 40 will be substantially (or at a maximum pressure having a predetermined relationship to atmospheric pressure and corresponding to the optimum extent of soil saturation desired) at atmospheric pressure. This will of course mean that atmospheric pressure (or that a predetermined known differential pressure, and differential force, which can be initially balanced out) will be applied to both the upper and lower surfaces of the servo diaphragm 70 which will thus result in a zero differential pressure and zero differential force being applied across the servo diaphragm 70 leaving, in effect, only the excess downward biasing force exerted by the biasing spring 84 thereon, which of course causes the servo valve member 78 to be forced into its downward extreme position as shown in FIG. 3 and FIG. 5, sealing the two ports 80 and 82.

Whenever the moisture-sensing means 40 causes (in a manner to be explained hereinafter) an effective reduction in the pressure within the vacuum duct 44 below ambient atmospheric pressure as a consequence of the fact that moisture in the surrounding body of earth 42 has been reduced to or is below a predetermined minimum value, consequently causing a predetermined soil suction value to be reached, the reduced pressure acting on the upper surface of the servo diaphragm 70 will result in a net upward-acting differential pressure and consequent net upward differential force being exerted upwardly on the servo diaphragm 70 sufficient to overcome the normal prevailing downward biasing force exerted thereon by the biasing spring 84 and will result in upward movement of the servo diaphragm 70, the connecting rod 72, and the servo valve member 78, which thus effectively temporarily opens both of the previously sealingly closed ports 80 and 82 in the manner best shown in FIG. 4.

The above-mentioned temporary opening of the two ports 80 and 82 in response to the reduction of water content of the body of earth 42 below a predetermined minimum value, allows water previously contained within the chamber 86 to escape through the ports 80 and 82 into the main outflow port 38 of the valve 36, thus allowing direct upward-acting water pressure from the inlet port 34 of the main valve 36 pressing against the lower surface of the main valve diaphragm 88 to cause the central portion of said diaphragm 88, which has previously been in sealing relationship with the valve seat 90, to move upwardly away from the valve seat 90 and to effectively place the inlet port 34 in direct communication with the outlet port 38 of the valve 36. This will allow water to flow through the main valve 36, the distributing pipe 24, and out of one or more sprinkler(s) 26 or other water dissemination or irrigation outlet means and onto the surface 46 of the entire body of earth 42. This is made possible entirely by reason of the fact that the water previously filling the chamber 86 by reason of its entry thereinto through the small inlet hole 91 at a time when the outlet hole 80 was closed by the servo valve member 78 in the manner shown in FIGS. 3 and 5 has provided a downward-acting pressure and force applied to the upper surface of the diaphragm 88 effectively neutralizing and/or overriding the previously mentioned upward-acting pressure and force and resulting in no net upward-acting differential pressure and/or force existing across the central part of the diaphragm 88 which, therefore, by reason of the fact that it was initially formed so as to assume the configuration thereof shown in FIG. 5, in which configuration it is held by reason of the fact that the cover member 92 defining the upper chamber 86 therewithin clampingly engages outer peripheral edges 94 of the resilient diaphragm 88.

Thus, it is only when the effectively larger outlet duct 80 is allowed to communicate with the similarly effectively larger outlet duct 82 by reason of the temporary lifting of the servo valve member 78 in the manner shown in FIG. 4 that an outlet greater than the inlet 90 is provided for the chamber 86 which allows the water previously trapped therewithin to escape through the ducts 80 and 82 and into the outlet port 38, thus making it possible for an upwardly acting differential pressure to temporarily exist across the central part of the diaphragm 88 so that it can be temporarily centrally deformed in an upwardly domed manner as shown in FIG. 4 to communicate the inlet and outlet ports 34 and 38.

It should be clearly understood that, just as soon as the servo valve member 78 returns to its normal lowermost off position as shown in FIGS. 3 and 5 as a result of the moisture-sensing means 40 responding to the increase in moisture within the body of earth 42 produced by the sprinkling of water thereon from the sprinkler means 26 to an extent such as to produce a reduction in soil suction to a predetermined minimum value, it will be understood that the chamber 86 again has no outlet, and inlet pressure will be fed thereinto through the port 91 until the pressure within the chamber 86 rises to a magnitude such that it, coupled with the natural resiliency of the edge-clamped diaphragm 88, produces downward force sufficient to cause downward movement of the temporarily upwardly resiliently deflected valving portion of the diaphragm 88 from the temporarily open position shown in FIG. 4 into the effectively sealed and closed position shown in FIGS. 3 and 5. This of course immediately isolates the inlet and outlet ports 34 and 38 from each other and stops all flow of water through the distributing pipe 24 and the water-disseminating sprinklers 26, or other irrigating outlet means.

It should be noted that the servomechanism housing portion 68 defining the servo chamber 64 has a threaded nut portion 94 threadedly mounted therein and which can be threadedly adjusted, by the use of an appropriate tool or one's fingers, upwardly or downwardly with respect to the rest of the housing portion 68 so as to effectively adjust the initial compression of the biasing spring means 84, which has the effect of controllably adjusting the operating point (or points) of the entire apparatus with respect to the previously mentioned soil suction magnitude and consequently the water content of the body of earth 42 around the moisture-sensing means 40 corresponding to the opening and closing of the valve 36. Incidentally, it should be noted that the maximum value of soil suction at which point the valve 36 is caused to open, may differ somewhat from the minimum value of soil suction at which the valve 36 is caused to close, by reason of the fact that there is a difference in the net upward force exerted on the moving assembly comprising the servo diaphragm 70, the connecting rod 72, and the servo valve member 78 during the valve-closing operation than during the valve-opening operation, which upward-acting force is greater in the case of a valve-closing operation and must be overcome, thus requiring that the soil suction be reduced to a lower value to close the valve 36 than the soil suction value at which the valve 36 opens. The difference between the two different operating points will determine the relative length of the on and off cycles. It should be noted that various other means for providing and/or adjusting the requisite differences in the oppositely directed forces at the valve-opening and valve-closing point of operation of the control assembly described above, and of any of a variety of different types well known in the art and, therefore, not described in detail, may be employed in lieu of the arrangement just described.

The exemplary first form of the invention illustrated includes controllably adjustable depth-positioning means, generally designated by the reference numeral 98, which includes the previously mentioned exterior threaded portion 52 carried by the moisture-sensing means 40 mounted in threaded engagement with the previously mentioned interiorly threaded portion 54 of the perforated pipe or housing 50 and also includes the previously mentioned operating handle 48 connected to the top of the moisture-sensing means 40 so that it can be rotated and, thus, caused to move either upwardly or downwardly within the housing 50 and consequently with respect to the body of earth 42. The operating handle 48 includes a vertically directed hollow tubular member 100 which actually communicates with the interior 60 of the cell 62 of the moisture-sensing means 40 and, thus, actually comprises a part of the previously mentioned vacuum tube 44. However, since the tube 100 is rotatable for the depth-adjustment purposes just described, a rotary sealed coupling 102 is connected around the periphery thereof and in communication therewith and is adapted to be locked thereon by rotation of the threaded portion 104 on the exterior threads 106 carried by the upper solid portion of the tube immediately above the hollow portion 100 thereof. Thus, when the nut 104 is in loose position, the operating handle 48 can be rotated and the entire tube 100 can be turned for the previously mentioned depth-adjustment purposes, while the laterally directed portion of the vacuum tube 44 connected to the coupling 102 does not rotate. As soon as the depth-adjustment operation has been completed, the nut 104 may be tightened on the threads 106 so as to effectively lock the coupling 102 to the tube 100. The arrangement provides an airtight connection between the interior 60 of the cell 62 of the moisture-sensing means 40 and the previously mentioned servo chamber interior 64 controlling the opening and closing operation of the main valve means 36.

It should be noted that the coupling means indicated at 102 is merely representative of one of the many possible forms which the connection of the vacuum tube 44 to the interior 60 of the porous-walled cell 62 may take, and it should be clearly understood that the invention is not specifically so limited. Where the invention includes depth adjustment or depth positioning means of the type illustrated in the first form of the invention, or any substantial functional equivalent thereof requiring rotation of the moisture-sensing means 40 for the purpose of providing such depth adjustment, various types of rotary coupling may be employed in lieu of the specific arrangement shown at 102 and may include arrangements wherein the relative rotation is made possible by flexibility of the parts or by the provision of an effective flexible coiled portion of the vacuum tube 44, or this may be provided by use of an extremely flexible material used in forming the vacuum tube 44. Also, a variety of other arrangements capable of transmitting the vacuum from the interior of the moisture-sensing means 40 to the servo operating portion 66 of the main valve 36 may be employed in lieu of the particular structural arrangement shown in the first form of the invention, which is merely employed for illustrative purposes. It should also be noted that in those forms of the invention wherein the depth positioning or depth adjustment means 98 is of a different type not requiring rotation of the parts in question, the coupling means 102 need not be of a rotary type at all. This is also true of those forms of the invention wherein no such depth positioning or depth adjustment means is provided, and it should be clearly understood that all such modifications are intended to be included and comprehended within the broad scope of the present invention.

The moisture-sensing means 40 may be said to comprise the previously mentioned hollow sealed cell or chamber-defining container means 62, which may wholly be made out of a water-permeable porous wall, such as that shown at 108, or may be partially made out of such a water-permeable porous wall 108, with the remainder thereof being made of any other suitable material. Preferably the porous wall 108 is made of a ceramic material having a great plurality of small passages through the porous wall portion 108 from the interior surface to the exterior surface thereof and each having an effective average aperture of a size such as to be effectively controlled by the physical phenomenon known as capillarity or capillary action, thus causing the transmission of water therethrough to occur in either direction, depending upon the differential extent of saturation existing on each side of the porous wall 108—the ultimate end result being an equalization of the degree of water saturation on each side of the porous wall 108.

The porous wall portion 108 referred to above may assume a variety of different forms, all within the broad scope of the present invention. Merely for representative purposes, one of the many different forms which the porous wall portion 108 may assume is shown in FIG. 11 wherein it is designated by the reference numeral 108 and is shown as having a plurality of communicating cells, such as indicated at 109 in a few representative instances, of closely controlled and relatively small dimensions disseminated throughout the cross section of the porous wall 108 and thus providing a great plurality of small, tortuous passages, such as indicated by the arrows 111 in a few representative cases, which extend through the porous wall portion 108 from the interior surface to the exterior surface thereof and with the connection apertures, such as the representative few shown at 113 in FIG. 11, being such as to cause the effective overall average aperture size of each through passage 111 to be of capillary dimensions for the purposes mentioned in the preceding paragraph.

FIG. 12 illustrates another alternate representative different form of many possible forms which the porous wall 108 may take, and in this example is designated by the reference numeral 108d. Indeed, all parts of this slight modification similar to corresponding parts of the first exemplary form illustrated in FIG. 11 are designated by similar reference numerals, followed by the letter "d," however. In this modification, it will be noted that each of the small capillary-size through passages, indicated in a few representative instances by the reference numeral 111d, extends completely through the porous wall portion 108d from one surface to the other surface thereof in substantially parallel relationship as illustrated in FIG. 12, although not specifically so limited, and it is functionally substantially equivalent to the FIG. 11 form and to many other possible forms which the porous wall may take within the broad scope of the present invention.

The porous wall 108 is adapted to be provided therearound with a water-holding, water-permeable, porous medium, usually of a particulate and granular nature, and, in certain cases, this may actually comprise the previously mentioned body of earth 42 surrounding the porous wall 108. However, in a preferred form of the invention, said surrounding porous, granular, water-permeable, and water-holding medium comprises both the previously mentioned body of earth 42 and an additional intermediately positioned quantity of a porous, water-permeable, water-holding, granular medium which may be said to comprise an intermediate porous medium and which in the example illustrated is designated by the reference numeral 110 and is shown as being held immediately outwardly adjacent to the porous wall 108 by a perforated container 112 having apertures 114 therein smaller than the particle size of the intermediate porous medium 110. Said intermediate porous medium 110 might comprise diatomaceous earth, ordinary earth, or any other granular water-permeable, water-holding medium suitable for effectively transmitting water in either direction between the porous wall 108 and the surrounding body of earth 42.

It should be clearly noted that the intermediate porous medium 110 is not limited to the specific examples referred to above but may be made of porous plastic material, porous ceramic material, or a variety of other water-holding and water-transmissive materials suitable for the above-defined purposes of the present invention.

Figures 6, 7, 8, 9:
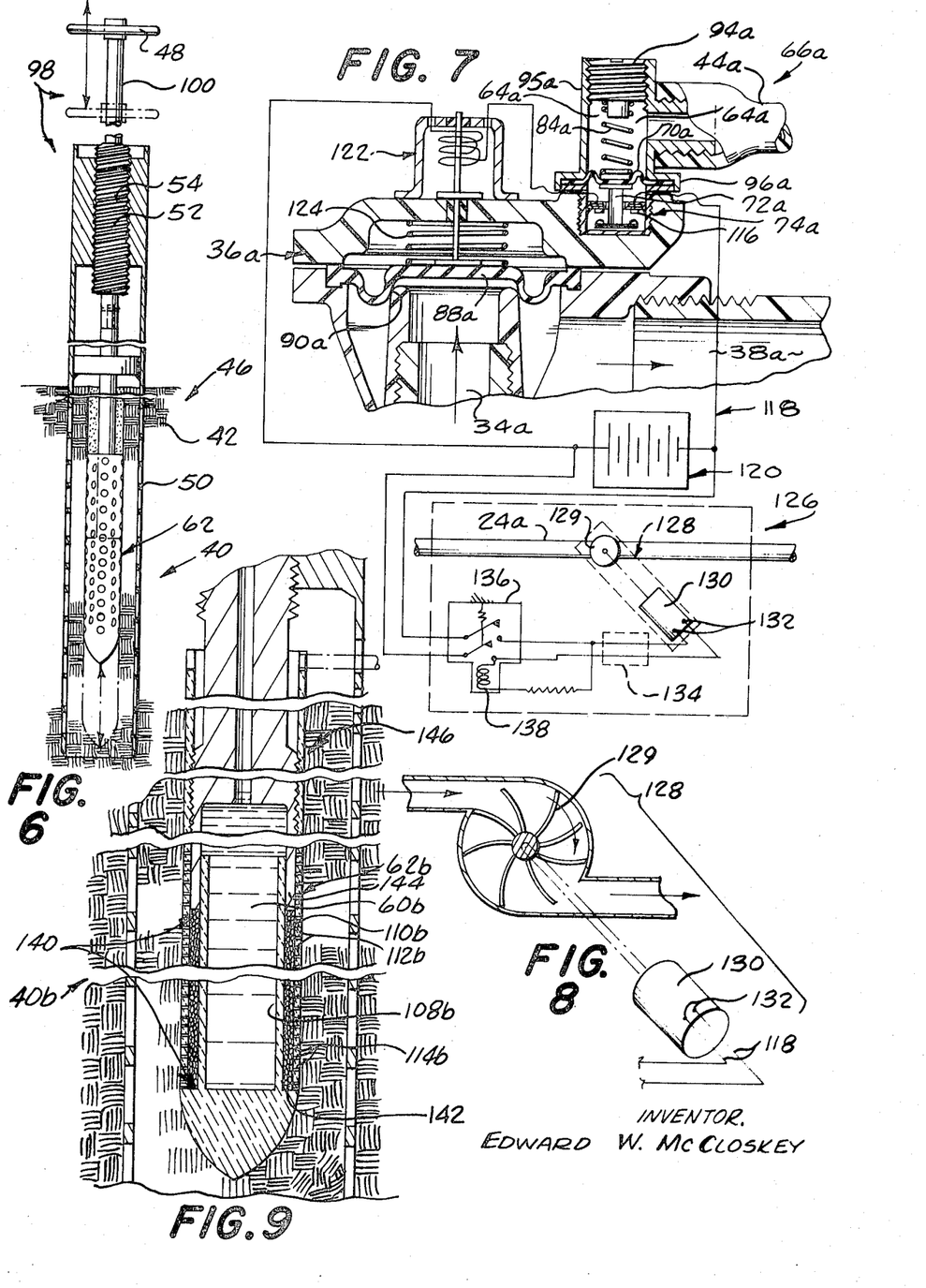
FIG. 6 is an enlarged, fragmentary, sectional view of the portion of the exemplary first form of the invention which adjustably mounts the moisture-sensing means so that it can be moved upwardly and downwardly relative to the surrounding earth and thus can have its depth of embedment controllably adjusted.
FIG. 7 is a view generally similar to FIG. 3, but illustrates a modified form of the invention wherein the waterflow-controlling valve means includes an electrical switch means adapted to be operated by the moisture-sensing means and also includes electric circuit means, electrical energy supply means and electrically energizable servomotor means controlled by said electrical switch means and in turn operatively controlling a valve in the flow path of water to the sprinkler. In the example illustrated in FIG. 7, the complete electrical system is self-contained and electrically insulated and isolated and includes means for recharging the electrical energy storage means between uses so that the complete electrical system will remain operative virtually indefinitely provided that the charging cycle which occurs during water flow periods maintains at least a predetermined ratio to the electrical discharging periods which correspond to periods of electrical energization of said servomotor means for changing the condition of said valve means.
FIG. 8 is an enlarged, fragmentary, partially broken away, somewhat schematic view of one exemplary but nonspecifically limiting form of waterflow-powered electrical generating means electrically coupleable with respect to said electrical energy storage means through electrical rectifier means during charging periods which correspond to waterflow periods so as to maintain said electrical energy storage means in adequately charged condition at all times.
FIG. 9 is a fragmentary, partially broken away, somewhat schematic view generally similar to FIG. 2, but illustrates a modified form of the moisture-sensing means provided with means for controlling the rate of inflow or outflow of water through the water-permeable, porous wall and the porous water-holding and water-transmissive medium adjacent thereto.

FIGS. 7 and 8 illustrate fragmentarily a slightly modified form of the invention and, therefore, parts which are structurally or functionally substantially identical to or similar to corresponding parts of the previously described form of the invention are designated by the same reference numeral, followed by the letter "a," however.

In the FIGS. 7 and 8 modification of the invention, the servo means generally designated by the reference numeral 66a is similar at its upper end to the corresponding portion of the first form of the invention. However, this similarity ends at some point along the connecting rod 72a which, instead of having a flow-controlling servo valve member such as that shown at 78 in the first form of the invention, operates a switch indicated by the reference numeral 116, which is normally open but which is adapted to be closed when the pressure communicated to the servo chamber 64a by the vacuum duct 44a falls to a predetermined minimum value corresponding to a similar reduction in water content of a body of earth in contact with a moisture-sensing means of a type such as that shown at 40 in the first-described form of the invention, which switch closure closes the corresponding electric circuit means 118 and effectively applies electrical energy from the electrical energy supply means generally designated by the reference numeral 120 to the electrically energizable servomotor means 122 which is shown as comprising a solenoid in the example illustrated and which effectively opens a valve member 88a normally engaging and sealingly closing a valve seat 90a so that the valve 36a will temporarily be open and communicate the inlet and outlet ports 34a and 38a and cause irrigation of an adjacent body of earth in a manner similar to that illustrated in FIG. 4 of the first form of the invention and previously described.

Of course, whenever the pressure within the vacuum duct 44a rises to a predetermined value as a consequence of the increased water content of a body of earth such as that shown at 42 of the first form of the invention and sensed by moisture-sensing means similar to that shown at 40 of the first form of the invention, the biasing spring 84a moves the connecting rod 72a in a manner such as to again open the normally open switch 116 which effectively deenergizes the servomotor or solenoid means 122 and allows the biasing spring 124 to again close the normally closed valve member 88a so as to isolate the inlet and outlet ports 34a and 38a from each other and stop the "on" cycle of the irrigating operation previously described. This will cause the electrically operated form of the apparatus to be functionally equivalent to the position of the first form of the invention as shown in FIG. 5.

The exemplary modified form of the invention illustrated in FIGS. 7 and 8 also shows novel charging means for rendering the electrical apparatus of this modification of the invention virtually self-maintaining so that it can be completely electrically isolated and insulated from the exterior of the structure containing same which, incidentally, may be made of an electrical insulating material. In other words, the apparatus can be completely self-contained electrically and need have no exterior electrical connections, thus rendering it virtually immune from exterior moisture or anything else which might normally tend to cause either shorted or open circuits, electrical leakage, or the like, which might tend to render such a device inoperative and require frequent electrical maintenance servicing thereof. This will not be necessary with the completely electrically self-contained apparatus of the modified form of the invention illustrated in FIGS. 7 and 8 by reason of the completely electrically isolated and insulated nature thereof which is primarily made possible by reason of the above-mentioned charging apparatus which is generally designated by the reference numeral 126.

The above-mentioned charging apparatus 126, in the exemplary but nonspecifically limiting form thereof illustrated in FIGS. 7 and 8, comprises waterflow-powered electrical generating means, such as is generally designated by the reference numeral 128, and which may comprise a turbine rotor, Archimedes Screw rotor, or any other engine element 129 adapted to be rotated or driven so as to drive a corresponding electrical generator 130, which may be of either a direct-current-producing generator type or an alternate-current-producing generator type, so that the output terminals 132 thereof will be capable of applying electric current through an optical rectifier means shown in broken lines at 134 and normally open switch means indicated generally at 136 to opposite terminals of the electrical energy storage means 120, which might comprise a storage battery or any other suitable electrical energy storage means.

It should be noted that normally the switch 136 is open so that the electrical energy storage means 120 has no opportunity to effectively drive the generator means 130 in a manner similar to the operation of a conventional electric motor, which might otherwise be possible in certain instances. However, just as soon as water flows through the waterflow-powered electrical generating means rotor 129 and causes electric power producing operation of the generator means 130, current flows through the shunting relay coil 138 and closes the normally open switch 136, which then immediately starts the charging of the electrical energy storage means or storage battery 120, which charging operation will continue for as long as water flows through the waterflow-powered electrical generating means rotor 129 unless this condition continues for such a long period of time that the battery 120 would become overcharged, with the consequent likelihood of damage occurring thereto. In order to prevent such an eventuality, a voltage regulator or overvoltage control switch means of any conventional type may be connected anywhere between the generator means 130 and the storage battery means 120 for opening the charging circuit if overcharging of the battery begins to occur. Details of this are not shown since such arrangements are well known in the art and do not touch upon the real inventive concept of the present invention.

While the electrical energy supply means has been referred to in the description of FIGS. 7 and 8 in one specific form at 120 as electrical energy storage means which, in one form, may comprise a storage battery, the invention is not specifically so limited and, actually, said electrical energy supply means may comprise what is known as a fuel cell which converts the energy of fuels into electrical energy and any device of this sort may be employed as the electrical energy supply means 120. It is possible in certain forms of the invention to provide an exterior or remote source of electrical energy adapted to be safely coupled to the electric circuit means 118 in input relationship with respect thereto, preferably by way of a stepdown, controlled maximum current, leakage flux type of input transformer or some other substantial functional equivalent, although not specifically so limited.

It should be noted that the arrangement of the complete waterflow-powered electrical generating means designated by the reference numeral 128 is merely representative of one of the many possible forms which it may assume and is not to be construed as specifically limiting the invention to said one representative form as illustrated in FIGS. 7 and 8. For example, the rotor 129 and the electrical generator 130 may be mounted as a unit on the pipe 24a (or, for that matter, on any of the other pipes of the complete system through which water is adapted to flow at least periodically), and this may be in an arrangement such that the generator 130 is exterior of the pipe while the rotor 129 is interior thereof, or the arrangement may be what might be referred to as an in-line construction with both the rotor 129 and the electrical generator 130 being carried within the pipe. Such a modification is illustrated very fragmentarily in FIG. 8A, and parts similar to those of FIGS. 7 and 8 are designated by similar reference numerals and letters, primed, however. It should be understood that this is merely representative of another one of the many possible physical arrangements for the mounting of the various parts of the complete generator means and all of which are intended to be included and comprehended within the broad scope of the present invention.

FIG. 9 illustrates a slightly modified form of the moisture-sensing means generally designated by the reference numeral 40 in the exemplary first form of the invention and designated by the reference numeral 40b in the FIG. 9 modification thereof. Indeed, all parts structurally or functionally identical to or similar to corresponding parts of the first form of the invention are designated in FIG. 9 by similar reference numerals, followed by the letter "b," however.

The FIG. 9 modification of the moisture-sensing means 40b includes means for controllably adjusting the rate of inflow or outflow of water through the water-permeable, porous wall 108b and the intermediately positioned, porous, water-permeable medium 110b immediately outwardly adjacent to the porous wall 108b, thus making it possible to effectively regulate the sensitivity of the moisture-sensing means 40b and consequently the length of the "on" and "off" periods of the entire apparatus.

In the FIG. 9 modification, the controllably adjustable means generically referred to above for controlling the rate of inflow and outflow of water with respect to the hollow interior 60b of the cell 62b of the moisture-sensing means 40b, takes the form of a means for controllably compressing the intermediately positioned porous medium 110b (or decompressing same) so as to effectively vary the average cross-sectional area of each of the plurality of tortuous-path through-passages extending between inside and outside surfaces of the intermediately positioned porous medium 110b, thus effectively controlling the average porosity thereof and consequently the rate of water passage therethrough in either direction.

In the exemplary but nonspecifically limiting modified form of the invention illustrated in FIG. 9, the above-mentioned porosity control means for the intermediate porous medium 110b may be said to comprise controllably adjustable press means generally designated by the reference numeral 140 which, in said example, is shown as comprising a lower annular anvil portion 142 carried within the perforated container 112b and immediately outwardly adjacent to the porous wall 108b and a longitudinally spaced annularly shaped press plunger member 144 also positioned between the perforated container 112b and outwardly of the porous wall 108b and bearing against the opposite end of the intermediate porous medium 110b from that abutting the anvil portion 142 and thus defining an annular compression chamber between porous wall 108b, the outwardly radially spaced container 112b, and the two similarly annularly spaced members comprising the anvil portion 142 and the plunger press portion 144 which contains therein said intermediate porous medium 110b which is of a compressible porous material of any of the types previously mentioned and which may also comprise a porous communicating-cell type of plastic material in certain forms of the invention.

The press means 140 also includes an effective actuating or lead screw portion generally designated at 146 capable of being actuated or operated, either at the immediate location or at a remote location above ground level after the entire moisture-sensing means 40b has been embedded in a body of earth similar to that shown at 42 of the first form of the invention. In any case, said actuating means 146 when operated in one manner will cause the annular plunger press portion 144 to be advanced longitudinally toward the fixed anvil portion 142 so as to apply increasing pressure on the intervening intermediate porous medium 110b whereby to effectively reduce the porosity thereof to the lateral transmission of water therethrough in either direction. Conversely, the opposite type of operation of the actuating means 146 will effectively increase the longitudinal distance between the annular press portion 144 and the annular anvil portion 142 and, thus, reduce a normal previously maintained degree of compression on the intermediate porous medium 110b positioned therebetween, in a manner effectively increasing the average porosity of said intermediate porous medium 110b so as to increase the lateral water transmission capability thereof.

It should also be noted that as an alternate to the compression type of water transmission adjusting means indicated generally at 140 and described above in detail, the apparatus may be modified very slightly so that the actuating means 146 may merely actuate an external covering sleeve rather than the press portion 144 which would cause such a covering sleeve to move longitudinally along the perforated container 112b so as to modify the area of exposure thereof to the transmission of water through the intermediate porous medium 110b which will also cause an effective overall corresponding modification of the water transmission capability of the intermediate porous medium 110b. Such a modification and all other substantially functionally equivalent modifications or arrangements embodying the principle of controllable adjustment of the water transmission characteristic of either the intermediate medium 110b, the porous wall 108b, or both of same, may be employed and are intended to be included and comprehended within the broad scope of the present invention.

FIG. 10 is a view of a somewhat fragmentary and schematic nature generally similar to the FIG. 7 form of the invention but illustrates a modification thereof wherein the control of the main valve is not of an on/off type but is of a proportionate, inverse, feedback nature so as to cause an amount of water to be disseminated in an irrigating sense onto a body of earth in a manner which is a proportional direct function of the deficiency in the moisture in said body of earth immediately around the moisture-sensing means or is a proportional inverse function of the moisture in said body of earth. Because this view does illustrate a modification, parts of which are functionally or structurally substantially identical or similar to corresponding parts of previously described forms of the invention, similar reference numerals, followed by the letter "c," however, are used to designate said corresponding parts thereof.

In the FIG. 10 modification, the valve 36c is no longer of an on/off type but instead is of a type where the valve member 88c is adapted to be progressively opened (and, conversely, closed) by rotation of the valve stem 89 so as to make possible a great variation in the flow rate of water passing through the valve 36c and adapted to be disseminated in an irrigating manner with respect to an adjacent body of earth in a manner similar to that previously described in connection with the first form of the invention. Furthermore, in this modification of the invention, the servo means indicated generally at 66c is of a somewhat different type from that shown in FIG. 7, having two different functions, one of which is similar to that shown in FIG. 7 and comprises the closure of a snap-action, two-position switch 116c by means of a rotary cam 117 driven by the member 72c operating the rack 119, spur gear 121, and two bevel gears 123, said switch 116c being functionally generally similar to that shown at 116 in FIG. 7; and the other of which comprises the operation of a rotary variable resistor, such as that designated by the reference numeral 148, and which comprises one leg of a bridge circuit generally designated by the reference numeral 150. In other words, the rotary resistor 148 may be said to be a moisture-responsive resistor which has its resistance modified in accordance with an increasing deficiency of moisture in a body of earth surrounding a moisture-sensing means, such as that shown at 40 of the first form of the invention, which thus correspondingly unbalances the bridge circuit 150 as a function of the so-called "soil suction" sensed by the moisture-sensing means. Also, the servomotor means 122c is of a different type from that shown at 122 in FIG. 7 and is arranged to progressively controllably modify the resistance of another rotary variable resistor 152 comprising another leg of the bridge circuit 150, while at the same time and in the same manner progressively opening the valving member (functionally generally equivalent to the part 88 of the first form of the invention, although of a rotary proportional type) of the proportional type of water valve 36c of this modification of the invention. Thus, the modified arrangement illustrated in FIG. 10 is such that when the moisture-sensing means (similar to 40 of the first form of the invention) senses a moisture deficiency in the surrounding earth, the switch 116c is closed, which initiates several operations, as follows. First, it causes a reduction in the resistance of the resistor 148 as a function of the soil suction, or as an inverse function of the moisture content of the soil, which unbalances the bridge 150 and, second, by reason of the imbalance in the bridge circuit 150, the previous zero voltage existing across the servomotor means 122c now becomes a positive voltage thereacross operable to cause the servomotor 122c to progressively open the valve member of the proportionate waterflow-controlling valve 36c and, at the same time, begin to correspondingly modify the resistance of the resistor 152. This modification of the resistor 152 (which comprises a reduction thereof in the example just described) will progressively decrease the imbalance of the bridge 150 until there is no voltage across the servomotor means 122c which will cause it to stop in whatever position it is in when the voltage thereacross reaches zero. This will also cause the valve member of the proportional valve 36c to stop opening at whatever position it is in at that instant and to thereafter remain open to that extent. This condition will then continue until the moisture-sensing means senses an increase in the moisture content of a body of earth surrounding the moisture-sensing means which will cause a reduction in the soil suction and will consequently cause the resistance of the resistor 148 to be increased, which will cause an oppositely directed imbalance of the bridge circuit 150, which will cause an oppositely directed voltage to be applied across the servomotor means 122c, which, being reversible, will now operate in the opposite direction and will thus cause the resistance of the resistor 152 to be increased toward a bridge-balancing condition and, at the same time, will cause progressive closing movement of the valving member of the proportionate-type waterflow-controlling valve 36c. These two actions will continue until the bridge circuit 150 is again in balance, which will remove all voltage from the servomotor means 122c and cause it to cease to operate. Since, presumably, this has occurred before the valve 36c has been completely closed, there will be a further repetition or continuation of this action as more and more water continues to flow through the partially open valve 36c until such time as the moisture sensed by the moisture-sensing means 40c is such as to correspond to full closure of the valve 30c by the servomotor means 122c. This condition can be adjusted by merely adjusting the correlation between the linkage operating the valving member of the proportional valve 36c and the adjustable resistance 152. Also corresponding adjustment of the resistor 148 with respect to the linkage between same and the moisture-sensing means may be provided for adjustment, initial setting, and calibration purposes.

The linkage between the switch 116c and the moisture-sensing means may also be adjusted for such calibration and minimum operating point purposes since it is clear that the point in the range of operation of the moisture-sensing means at which the switch 116c is opened (and also the point at which it is closed) determine the inactivation point (and activation point) of the entire servo means. Thus, it is possible to control the operating point (or points) of the entire servo means by adjustment thereof.

It should also be noted that in certain forms of the invention the switch 116c may be eliminated if this particular operating control is not thought necessary.

It should be clearly understood that the particular type of linkage and coupling means shown between the differential pressure servo means 66c (which operates the rod 72c upwardly or downwardly in correspondence with decreasing or increasing moisture in a body of soil surrounding a moisture-sensing means similar to that shown at 40 in the first form of the invention illustrated), the cam 117 controlling the operation of the switch 116c, and also the rotary variable resistor 148. The arrangement illustrated in FIG. 10 is merely exemplary and is not intended to limit the invention to the particular arrangement of gears shown. Actually, in most instances a pneumatic, hydraulic, or other type of servo means positioned between the member 72c and the switch-operating cam 117 and the rotary resistor 148 will probably be employed in order to make it possible for a very small amplitude differential pressure signal, produced by the previously described apparatus of the invention in response to a small change in moisture content of a body of soil in which the moisture-sensing means is positioned, to be capable of effectively operating same. A dynamic fluid amplifier means, any of numerous types of conventional hydraulic amplifier means, mechanical amplifier means, or various other types of amplifier means including any selected from the entire available range thereof may be employed in lieu of the arrangement illustrated in FIG. 10, which is purely for illustrative purposes.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Waterflow-controlling apparatus for an automatic irrigation system, comprising: moisture-sensing means adapted to be positioned in a porous medium for sensing the water content thereof, said moisture-sensing means taking the form of a hollow, sealed, chamber-defining container means having at least a portion thereof provided with a water-permeable porous wall and being adapted to be filled with water, said chamber-defining container means tending, upon the passage of a portion of water adapted to be contained therein, through said water-permeable porous wall, to create within the interior of said chamber-defining container means a vacuum or a pressure less than an initial pressure corresponding to an initial degree of water content of a porous medium adapted to surround said moisture-sensing means, said water-permeable wall being adapted to be placed in effective water transmission relationship with respect to, and embedded at a selected depth within a porous medium which is adapted to be controllably irrigated by the apparatus; and waterflow-controlling and valve means effectively coupled with respect to the interior of said chamber-defining container means and effectively responsive to negative pressure variations therein of a predetermined magnitude to initiate a waterflow on-cycle at a predetermined low pressure of the interior of said chamber-defining container means; and controllably adjustable depth-positioning means operable for controlling the depth of embedment of said chamber-defining container means within a body of earth.

2. Waterflow-controlling apparatus as defined in claim 1, wherein said waterflow-controlling and valve means also is effectively responsive to positive pressure variation of the interior of said chamber-defining container means, relative to the pressure at which initiation of said waterflow on-cycle occurs, to terminate said waterflow on-cycle and to correspondingly initiate a corresponding waterflow off-cycle at a predetermined high pressure of the interior of said chamber-defining container means.

3. Waterflow-controlling apparatus as defined in claim 1, wherein said waterflow-controlling and valve means comprises main waterflow-controlling valve means and servo means operatively controlling same and effectively coupled with respect to said interior of said chamber-defining container means, said servo means being effectively responsive to negative pressure variations applied thereto from the interior of said chamber-defining container means and of a predetermined magnitude to initiate a waterflow on-cycle when said pressure reaches a predetermined low pressure less than that corresponding to the pressure present within said interior of said chamber-defining container means when virtually no water passes through said water-permeable porous wall.

4. Waterflow-controlling apparatus as defined in claim 3, wherein said servo means is also so connected with respect to the interior of said chamber-defining container means as to be effectively responsive to positive pressure variations of a predetermined magnitude to initiate a waterflow off-cycle when said pressure within the interior of said chamber-defining container means reaches a high predetermined pressure substantially corresponding to an initial normal starting condition of said waterflow-controlling and valve means when virtually no water passes through said water-permeable porous wall.

5. Waterflow-controlling apparatus as defined in claim 1, including a water-holding porous medium contiguous to and in water-transmissive relationship with respect to at least a portion of said porous wall.

6. Waterflow-controlling apparatus as defined in claim 2, including a water-holding porous medium contiguous to and in water-transmissive relationship with respect to at least a portion of said porous wall.

7. Waterflow-controlling apparatus as defined in claim 3, including a water-holding porous medium contiguous to and in water-transmissive relationship with respect to at least a portion of said porous wall.

8. Waterflow-controlling apparatus as defined in claim 4, including a water-holding porous medium contiguous to and in water-transmissive relationship with respect to at least a portion of said porous wall.

9. Waterflow-controlling apparatus as defined in claim 5, wherein said porous medium comprises a porous, granular body of earth which is adapted to be controllably irrigated said porous medium will result in the corresponding transmission of water from the interior of said chamber-defining container means into said porous medium and the consequent reduction of interior pressure within said chamber-defining container means to said predetermined low pressure and the consequent initiation of said waterflow on-cycle until said porous medium becomes sufficiently saturated with water to cause a reverse transmission of water through said porous wall of said chamber-defining container means into the interior thereof, resulting in the interior pressure rising above said predetermined low pressure and consequently causing the cessation of said waterflow on-cycle and the initiation of a waterflow off-cycle.

10. Waterflow-controlling apparatus as defined in claim 5, wherein said porous medium comprises an intermediate water-holding, water-transmissive, porous medium and an outer, porous medium taking the form of a porous, granular body of earth which is adapted to be controllably irrigated by the apparatus whereby to provide an arrangement such that progressive drying of the body of earth comprising said outer porous medium will result in the corresponding transmission of water from the interior of said chamber-defining container means into said porous medium and the consequent reduction of interior pressure within said chamber-defining container means to said predetermined low pressure and the consequent initiation of said waterflow on-cycle until said porous medium becomes sufficiently saturated with water to cause a reverse transmission of water through said porous wall of said chamber-defining container means into the interior thereof, resulting in the interior pressure rising above said predetermined low pressure and consequently causing the cessation of said waterflow on-cycle and the initiation of a waterflow off-cycle.

11. Waterflow-controlling apparatus as defined in claim 10, including controllably adjustable means cooperable with respect to said intermediate, porous medium for controllably adjusting the effective water transmission capability thereof.

12. Waterflow-controlling apparatus as defined in claim 10, including controllably adjustable means cooperable with respect to said intermediate, porous medium for controllably adjusting the average effective porosity thereof and consequently the effective lateral water transmission capability thereof.

13. Waterflow-controlling apparatus as defined in claim 6, wherein said porous medium comprises a porous, granular body of earth which is adapted to be controllably irrigated by the apparatus whereby to provide an arrangement such that progressive drying of the body of earth comprising said porous medium will result in the corresponding transmission of water from the interior of said chamber-defining container means into said porous medium and the consequent reduction of interior pressure within said chamber-defining container means to said predetermined low pressure and the consequent initiation of said waterflow on-cycle until said porous medium becomes sufficiently saturated with water to cause a reverse transmission of water through said porous wall of said chamber-defining container means into the interior thereof, resulting in the interior pressure rising above said predetermined low pressure and consequently causing the cessation of said waterflow on-cycle and the initiation of a waterflow off-cycle.

14. Waterflow-controlling apparatus as defined in claim 7, wherein said porous medium comprises a porous, granular body of earth which is adapted to be controllably irrigated by the apparatus whereby to provide an arrangement such that progressive drying of the body of earth comprising said porous medium will result in the corresponding transmission of water from the interior of said chamber-defining container means into said porous medium and the consequent reduction of interior pressure within said chamber-defining container means to said predetermined low pressure and the consequent initiation of said waterflow on-cycle until said porous medium becomes sufficiently saturated with water to cause a reverse transmission of water through said porous wall of said chamber-defining container means into the interior thereof, resulting in the interior pressure rising above said predetermined low pressure and consequently causing the cessation of said waterflow on-cycle and the initiation of a waterflow off-cycle.

15. Waterflow-controlling apparatus as defined in claim 8, wherein said porous medium comprises a porous, granular body of earth which is adapted to be controllably irrigated by the apparatus whereby to provide an arrangement such that progressive drying of the body of earth comprising electrically energizable servomotor means, main water valve means effectively operable by said servomotor means, and electrical energy supply means electrically connectable with respect to said servomotor means.

16. Waterflow-controlling apparatus as defined in claim 1, including a water-holding, porous medium comprising said body of earth in which the chamber-defining container means is embedded, which is contiguous to and in effective water-transmissive relationship with respect to a portion of said porous wall of said chamber-defining container means.

17. Waterflow-controlling apparatus as defined in claim 1, wherein said waterflow-controlling means comprises differential-pressure-operated electrical switch means, by the apparatus whereby to provide an arrangement such that progressive drying of the body of earth comprising said porous medium will result in the corresponding transmission of water from the interior of said chamber-defining container means into said porous medium and the consequent reduction of interior pressure within said chamber-defining container means to said predetermined low pressure and the consequent initiation of said waterflow on-cycle until said porous medium becomes sufficiently saturated with water to cause a reverse transmission of water through said porous wall of said chamber-defining container means into the interior thereof, resulting in the interior pressure rising above said predetermined low pressure and consequently causing the cessation of said waterflow on-cycle and the initiation of a waterflow off-cycle.

18. Waterflow-controlling apparatus for an automatic irrigation system, comprising: moisture-sensing means adapted to be positioned in a porous medium for sensing the water content thereof, said moisture-sensing means taking the form of a hollow, sealed, chamber-defining container means having at least a portion thereof provided with a water-permeable porous wall and being adapted to be filled with water, said chamber-defining container means tending, upon the passage of a portion of water adapted to be contained therein, through said water-permeable porous wall, to create within the interior of said chamber-defining container means a vacuum or a pressure less than an initial pressure corresponding to an initial degree of water content of a porous medium adapted to surround said moisture-sensing means, said water-permeable wall being adapted to be placed in effective water transmission relationship with respect to, and embedded at a selected depth within a porous medium which is adapted to be controllably irrigated by the apparatus; and waterflow-controlling and valve means effectively coupled with respect to the interior of said chamber-defining container means and effectively responsive to negative pressure variations therein of a predetermined magnitude to initiate a waterflow on-cycle at a predetermined low pressure of the interior of said chamber-defining container means; said waterflow-controlling means comprising differential-pressure-operated electrical switch means, electrically energizable servomotor means, main water valve means effectively operable by said servomotor means, electrical energy supply means, taking the form of electrical energy storage means electrically connectable with respect to said servomotor means and waterflow-powered electrical generating means electrically coupleable with respect to said electrical energy supply means for periodically storing electrical energy in said electrical energy supply means during periods of waterflow when said on-cycle has been initiated in excess of the amount of electrical energy required to operate said servomotor means to periodically initiate said on-cycle and said off-cycle at repetition rates less than a predetermined average normal frequency.

* * * * *